Sept. 2, 1969  J. W. ERICKSON ETAL  3,464,369
SUSPENSION AND LOCKING MECHANISM FOR LOAD DIVIDING GATE
Filed July 25, 1966  6 Sheets-Sheet 1

INVENTORS.
JOHN W. ERICKSON,
MARION G. KONRAD,
JAMES McCLOUD,
By Charlton M. Lewis

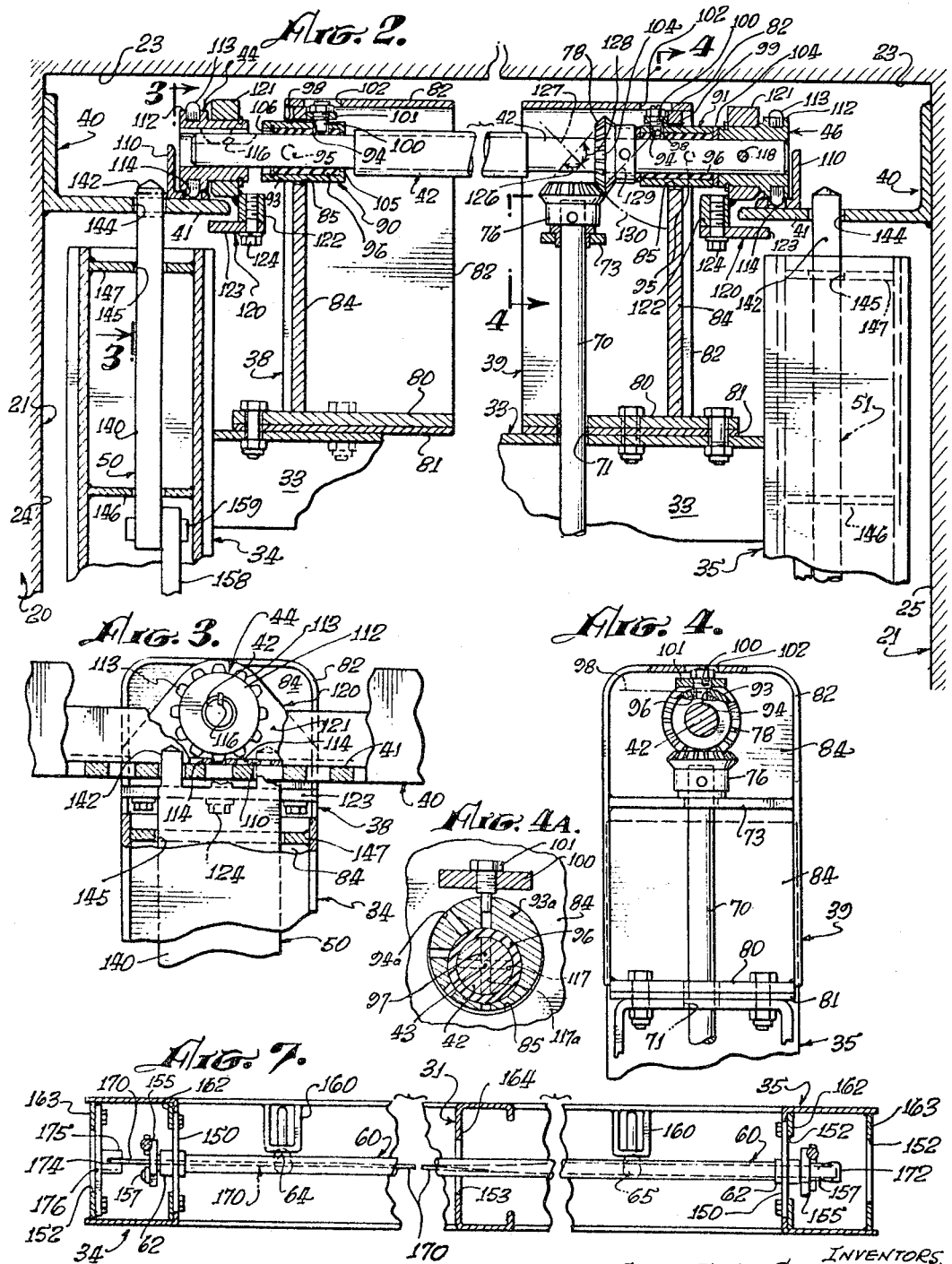

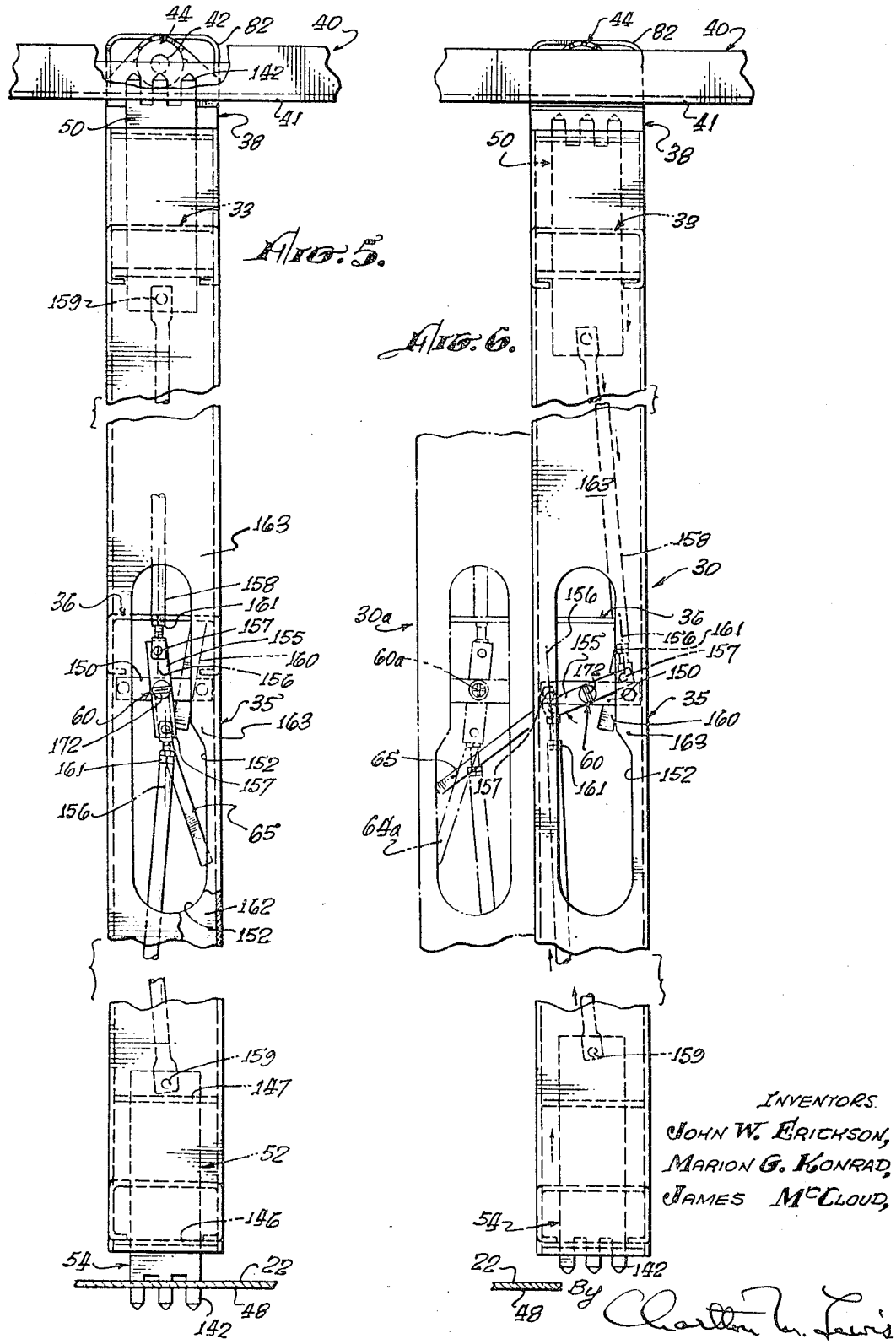

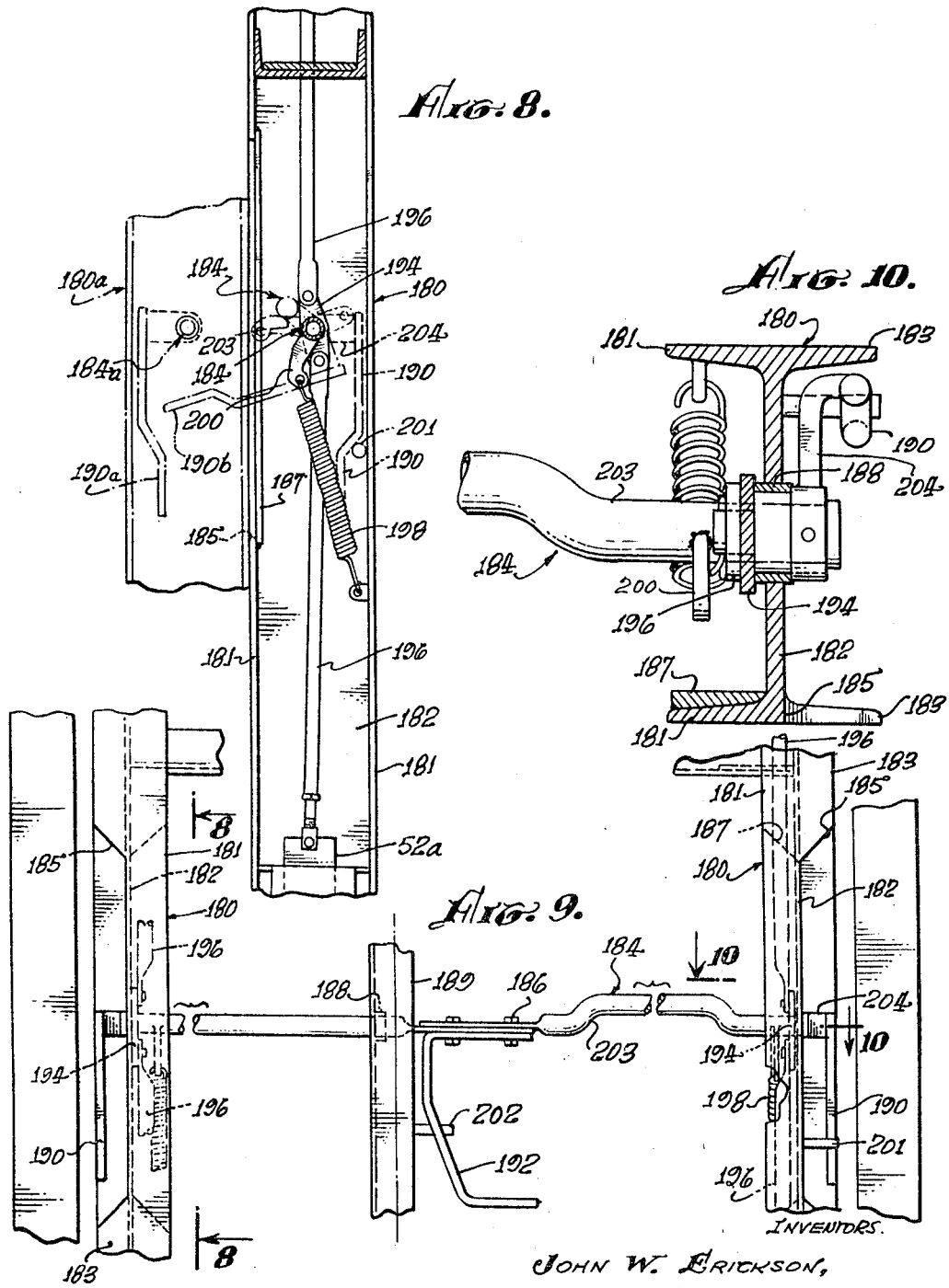

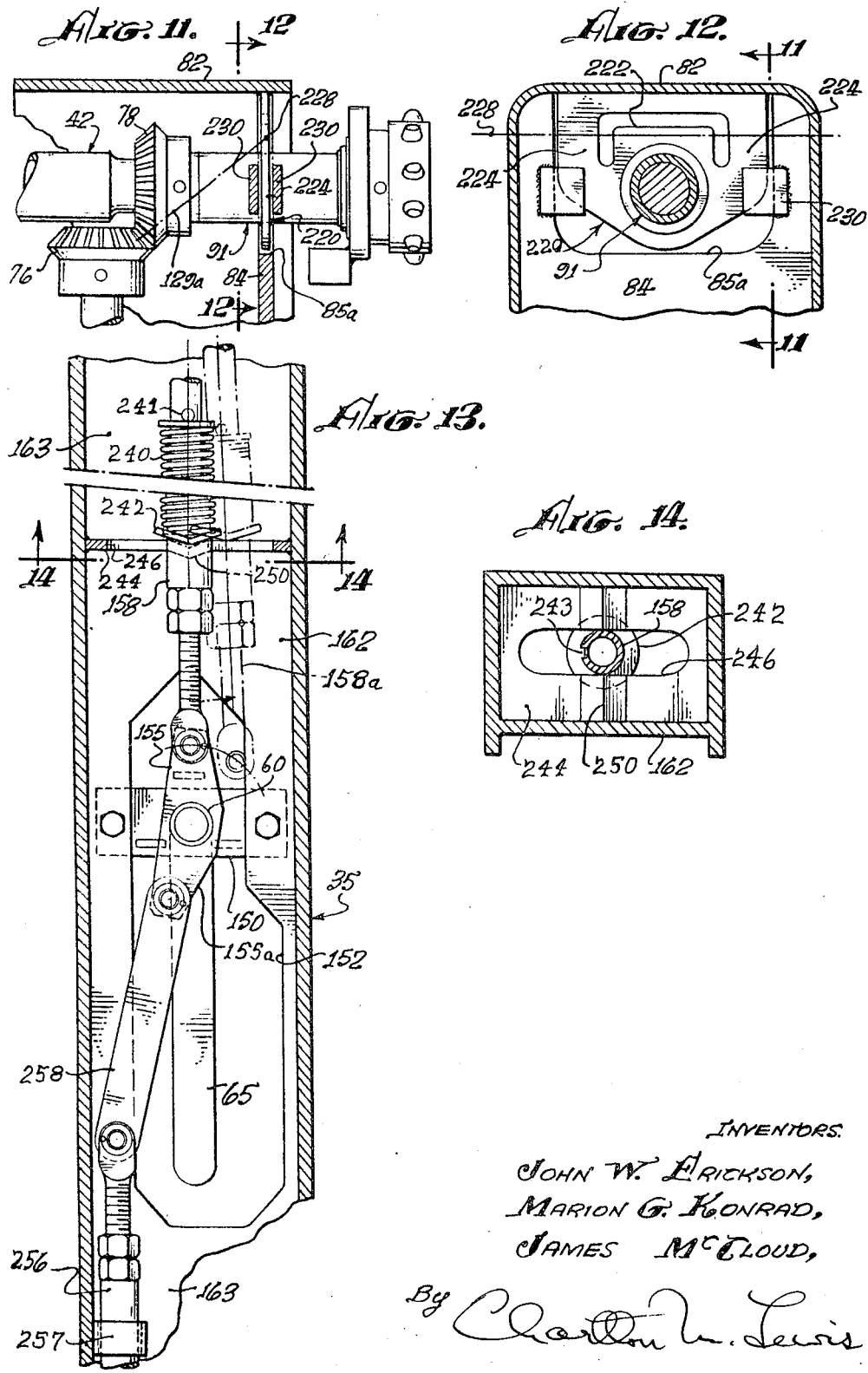

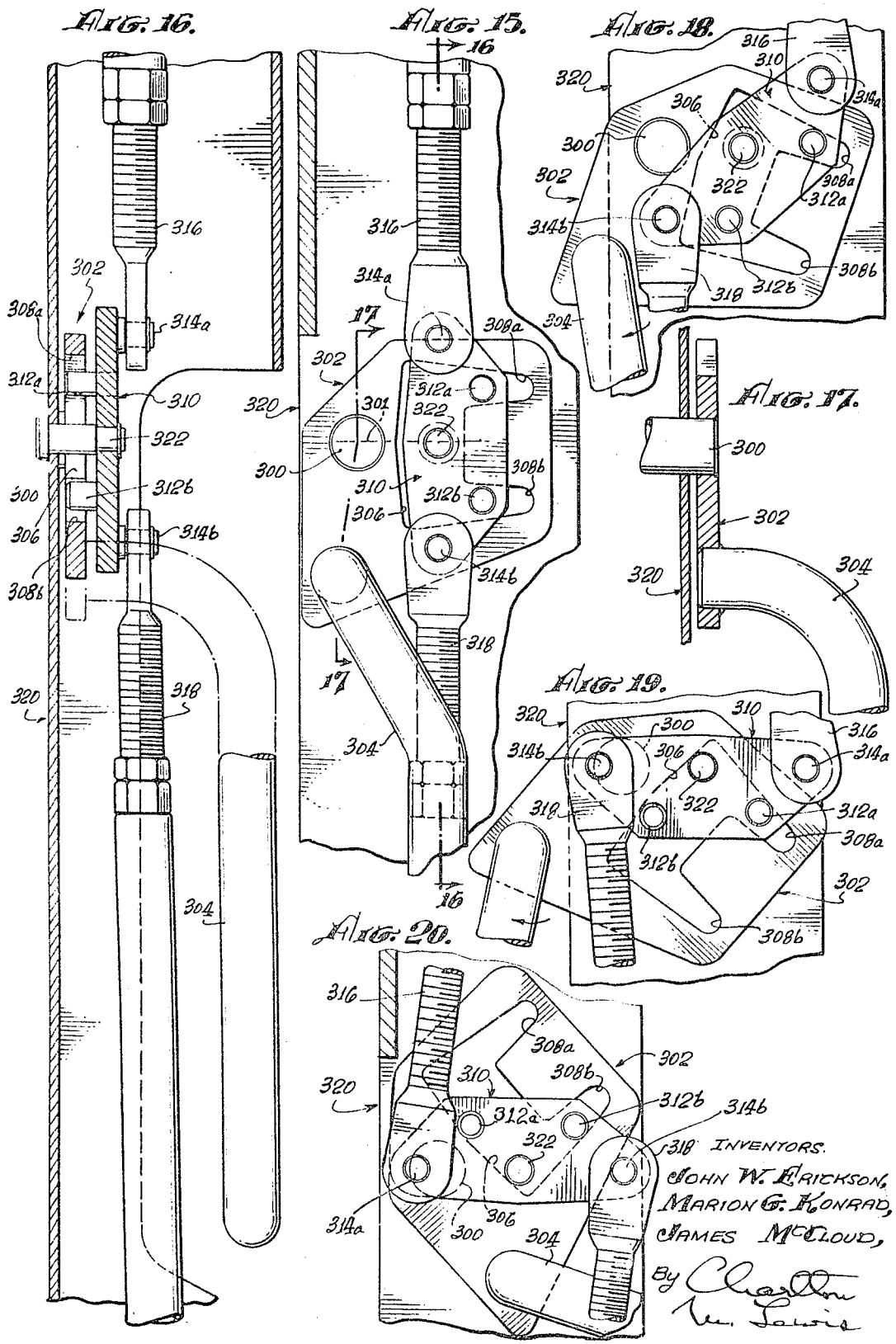

United States Patent Office 3,464,369
Patented Sept. 2, 1969

3,464,369
SUSPENSION AND LOCKING MECHANISM FOR LOAD DIVIDING GATE
John W. Erickson, Huntington Beach, Marion G. Konrad, Hacienda Heights, and James McCloud, Torrance, Calif., assignors to Preco Incorporated, Los Angeles, Calif., a corporation of California
Filed July 25, 1966, Ser. No. 567,640
Int. Cl. B61d 17/00
U.S. Cl. 105—376                                16 Claims

ABSTRACT OF THE DISCLOSURE

The described supporting and locking structures for load dividing gates in freight carrying vehicles facilitate mounting the gate supporting shaft on plain bearings of synthetic polymerized materials by allowing free bearing movement to accommodate shaft deflection. Manual drive of the support shaft is coupled via bevel gears which are specially placed relative to the bearings to avoid gear damage due to shaft deflection.

The locking pins for locking the gate in operating position are driven by a manual shaft coupled to the pins by respective crank mechanisms. Pin engagement is insured by resilient means acting on the shaft to maintain it in fully locking position, which is at or near dead-center for the cranks. A spring may act directly on the shaft, preferably as a torsion spring inside a tubular shaft, or may act on one of the pin linkages, with mechanism for restoring that linkage to essentially dead-center position with respect to the crank.

Interference between the operating handles for closely adjacent gates is prevented by special placement of the handles.

A coupling mechanism between the control shaft and locking pins permits shaft rotation through a small angle to produce pin movement corresponding generally to crank rotation through a larger angle.

Correct alinement of the locking pins with their locking recesses is facilitated by eccentric adjustment of the bearings for the gate-supporting shaft, and by relative rotational adjustment of the sprockets at the shaft ends.

This invention has to do with load dividing gates or bulkheads for freight carrying vehicles, and relates more particularly to such gates that are movable longitudinally of a lading compartment between a plurality of positions and are releasably lockable in a selected position to restrain movement of cargo during transit.

One aspect of the invention relates especially to load dividing gates that are locked in the selected working position by means of locking elements such as pins that are typically projectible from the gate under common control of a manually shiftable handle and that engage rack-like formations mounted on the vehicle. If such gates are left inadvertantly in unlocked condition they are subject to possible damage from sudden movements of the vehicle. An important object of the present invention is to provide simple and economical means for insuring that whenever such a gate is left by the operator it will be automatically locked and thus protected against such possible damage.

The present aspect of the invention further insures that once the gate is locked it will remain locked despite vibration or abnormal intermittent accelerations to which the vehicle may be subjected. That reliability of locking does not require operation of any special latch mechanisms or the like by the operator, but is an inherent property of the mechanism by which the locking structures are operated. Those and other advantages are attained by controlling most or all of the locking pins from a common rotatable control member via crank linkages that pass over center to gate locking position; and by spring loading the control member itself toward locking position. The present invention further provides particularly effective spring structure that embodies frictional damping against disturbance from vibrations.

A further aspect of the invention provides a novel arrangement of manual handles for operating the locking pin control member that permits ready manipulation of that control even when two gates are positioned immediately adjacent each other in face to face relation.

A further aspect of the invention relates especially to support means for load dividing gates of the described type, providing particularly reliable and economical bearing structure.

A common gate supporting structure utilizes a pair of horizontal rails fixedly mounted in the lading compartment in parallel spaced relation, with a cross shaft extending between the rails and carrying rollers that roll longitudinally on the rails. The gate is suspended from the cross shaft by means of suitable bearings that permit shaft rotation for moving the gate along the length of the rails. In some such structures the gate is journaled directly on the cross shaft; in others the gate structure includes a cross beam journaled on the shaft and means suspending the gate proper for rotary or translational movements with respect to the beam. In either case, the cross shaft carries the entire weight of the gate structure and is therefore subject to appreciable deflection, especially in response to sharp intermittent accelerations of the vehicle.

In accordance with the present invention the weight of the gate structure is applied to the support shaft bearings through mechanism that does not restrict angular bodily movement of the bearing in response to shaft deflection. That suspension mechanism facilitates the use of plain bearings of suitable material, which are better adapted than ball or roller bearings for continuously carrying the weight of the gate during travel of the vehicle.

A further aspect of the invention provides especially positive and convenient means for manually driving the described support shaft in its rotary movement to shift the gate longitudinally of the supporting rails. Such manual drive is positive in its action, and is therefore particularly convenient for such purposes as finally positioning the gate before actuating the locking mechanism or for moving the gate accurately to or from a relatively inaccessible position.

For such manual drive of the gate movement, the present invention provides a manually rotatable drive shaft journaled on the gate structure on an axis that is typically vertical and that transversely intersects the support shaft. The drive shaft and the gate supporting shaft are coupled rotatively by bevel gears, which, in and of themselves, are typically of conventional design. That arrangement provides a positive and economical drive mechanism that can incorporate a high mechanical advantage if desired, for example to press the gate against the load with appreciable force before locking it. However, the gears of such a coupling between a generally vertical drive shaft and the gate supporting shaft tend to be subjected to severe stresses when the support shaft is deflected under the dynamic load of the gate. Such shaft deflection typically tends to vary the depth of penetration of the gear teeth and can easily fracture the gear teeth or otherwise damage the mechanism.

In accordance with the present invention, that difficulty is entirely avoided in remarkably simple manner by arranging the bevel gear coupling between the two shafts in a predetermined relation to one of the support shaft bearings, more fully described below, such that the depth of tooth penetration is essentially independent of deflections of the support shaft. Even quite extreme shaft deflections then do not exert any significant strain upon the meshing gears.

A full understanding of the invention, and of its further objects and advantages, will be had from the following description of certain illustrative manners in which it may be carried out. The particulars of that description, and of the accompanying drawings which form a part of it, are intended only as illustration of the invention and not as a limitation upon its scope, which is defined in the appended claims.

In the drawings:

FIG. 2 is a fragmentary section in the same aspect as FIG. 1 and at enlarged scale;

FIG. 3 is a section on line 3—3 of FIG. 2;

FIG. 4 is a section on line 4—4 of FIG. 2;

FIG. 4A is a fragmentary section similar to FIG. 4 at enlarged scale and representing a modification;

FIGS. 5 and 6 are elevations in the aspect of line 5—5 of FIG. 1 at enlarged scale, showing the gate in locked and released conditions, respectively;

FIG. 7 is a section on line 7—7 of FIG. 1;

FIG. 8 is a section on line 8—8 of FIG. 9;

FIG. 9 is an elevation, representing a modification;

FIG. 10 is a fragmentary section on line 10—10 of FIG. 9 at enlarged scale;

FIG. 11 is a fragmentary section corresponding generally to a portion of FIG. 2, take non line 11—11 of FIG. 12 and representing a modification;

FIG. 12 is a section on line 12—12 of FIG. 11;

FIG. 13 is a fragmentary vertical section in the aspect of FIG. 5 and representing a modification;

FIG. 14 is a section on line 14—14 of FIG. 13;

FIG. 15 is a section in the aspect of FIG. 13 and representing a modification;

FIG. 16 is a section on line 16—16 of FIG. 15;

FIG. 17 is a section on line 17—17 of FIG. 15; and

FIGS. 18, 19 and 20 are fragmentary sections like FIG. 15 and showing operating positions of the mechanism.

Figure 1:
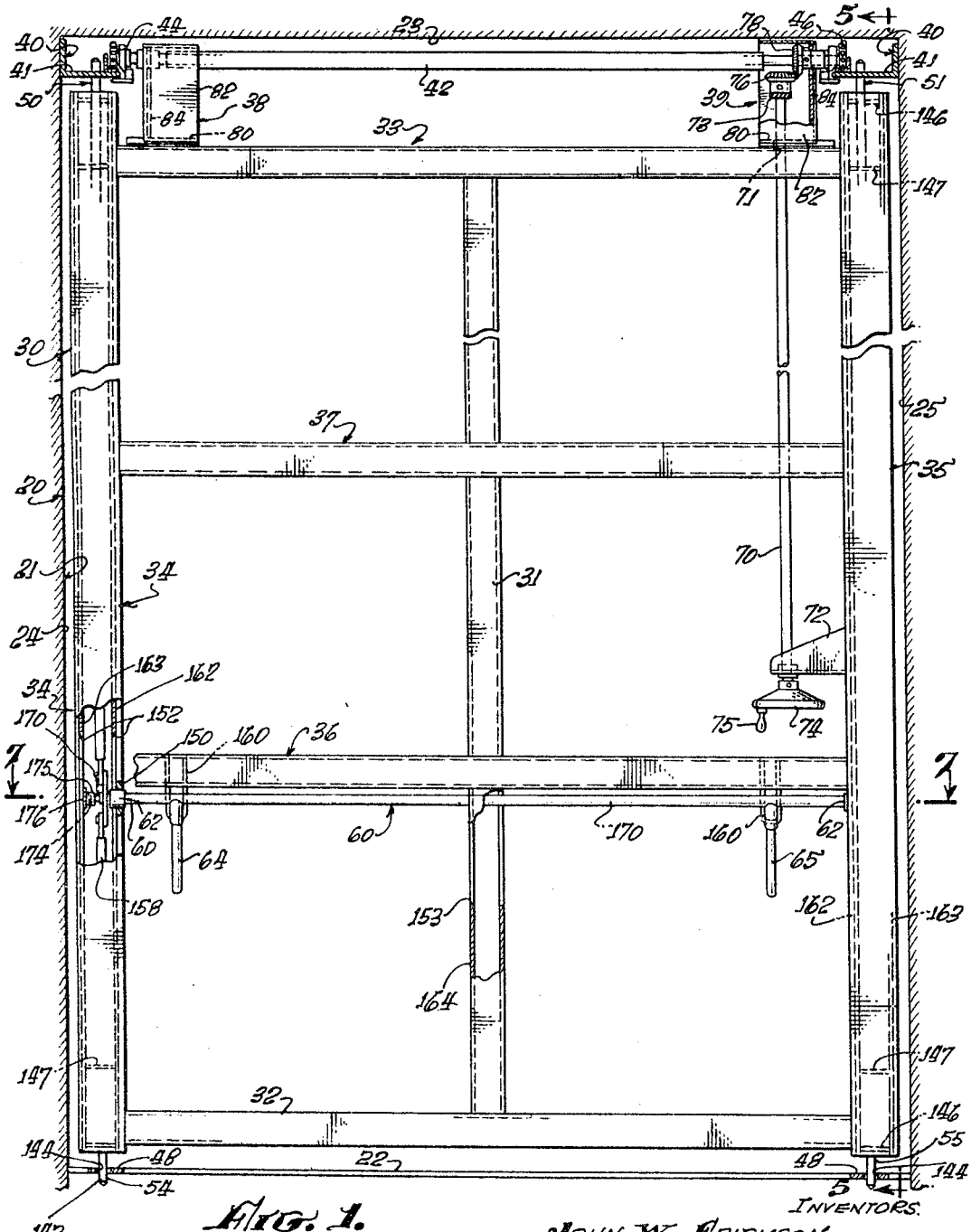
FIG. 1 is a transverse section through a typical vehicle lading compartment, showing in elevation an illustrative load dividing gate embodying the invention.

FIG. 1 represents schematically a transverse section through a typical lading compartment 21 of a railroad box car 20 of the type designed specifically for freight having relatively low weight per unit volume. The car floor is indicated at 22, the ceiling at 23 and the left and right side walls at 24 and 25, respectively. The terms "left" and "right" throughout the present description will refer to orientation as seen in FIG. 1, unless otherwise indicated. An illustrative load dividing gate in accordance with the present invention is shown in elevation at 30. The gate comprises the left and right vertical columns or posts 34 and 35, respectively, at the gate edges and the center column 31, rigidly connected by the horizontal top rail 33, the bottom rail 32, and the lower and upper intermediate rails 36 and 37. The resulting open frame structure is sufficient as shown, without any continuous facing, for restraining many types of cargo consisting of large units. However, a continuous facing may be provided if desired on the load engaging face of the gate, which is at the rear as seen in FIG. 1; and also on the front face if suitable clearance and access apertures are provided in the neighborhood of the operating handles, to be described.

Gate 30 is supported in the car by means of two rails 40 which extend longitudinally of the car and are fixedly mounted on the car structure, typically on side walls 24 and 25 close to ceiling 23. Rails 40 include the horizontal flanges 41 on which the cross shaft 42 rolls longitudinally by means of the sprocketed rollers 44 and 46. Left and right hangar assemblies 38 and 39, respectively, are rigidly mounted on upper gate rail 33 and support the weight of the gate on cross shaft 42. Suitable bearings are interposed between the hangar assemblies and the shaft as more fully described below.

Gate 30 can be releasably locked in a selected longitudinal position in compartment 21 by projecting the left and right upper locking pins 50 and 51 upward from the gate to insert their prongs into locking apertures in the respective rails 40, and also projecting the left and right lower locking pins 54 and 55 from the gate downward to insert their prongs into locking apertures in the respective floor rails 48, which are set into the car floor 22 adjacent the side walls. The locking pins are mounted in the respective columns 34 and 35 for vertical sliding movement between the projected positions shown in FIG. 1 and retracted positions in which the pin prongs are withdrawn from the rail apertures (FIG. 6), releasing the gate for movement longitudinally of the mounting rails. All four locking pins are operated simultaneously by rotation of the horizontal control shaft 60. That shaft is journaled in bearings 62 mounted on the inner webs of the left and right columns 34 and 35 just below cross rail 36. Control shaft 60 carries the two radially extending handles 64 and 65, which are rigidly mounted at respective different distances inward of the columns 34 and 35.

The vertical drive shaft 70 is journaled at its lower end on the bracket 72, mounted on column 35. The upper end of the shaft passes through a clearance aperture 71 in top rail 33 and is journaled on a cross plate 73 in hanger assembly 39 (FIGS. 2 and 4). The upper end of shaft 70 rigidly carries the bevel gear 76, which drivingly engages the bevel gear 78, rigidly mounted on support shaft 42. The lower end of shaft 70 carries the hand wheel 74 with crank handle 75, by which the shaft may conveniently be driven manually. Hand wheel 74 is located within easy reach of control handle 65 at the right side of the gate. Thus the operator can conveniently manipulate handle 65 with one hand to release or secure the locking pins and turn handwheel 74 with the other hand to drive the entire gate assembly longitudinally of its supporting rails 40. That dual control is particularly helpful in bringing the gate to the desired position with respect to the load and the rail apertures.

As shown best in FIGS. 2 to 4, each of the hanger assemblies 38 and 39 comprises a base plate 80, a housing 82 and a vertical transverse web 84 within the housing, all fixedly connected, as by welding. Base plate 80 is bolted to the upper face of gate rail 33, preferably with spacing shims 81, the thickness of which may be varied to make the gate edges accurately parallel to the car side walls. Hanger webs 84 are bored at 85 to receive the respective bearings 90 and 91 by which the gate is suspended from shaft 42. Those bearings typically comprise an essentially rigid outer sleeve 93 with locating radial bore 94 and grease fitting 95, and an inner bushing 96 of suitable non-metallic bearing material, such, for example, as polymerized tetrafluoroethylene, which is available commercially under the trade name Teflon. The lower portion of bushing 96 is preferably channeled and bored to admit grease from fitting 95 to the working surface of the bearing. Bearing sleeves 93 fit freely in the web bores 85. The weight of the gate is thus supported on definite areas of contact at 99 at the top surfaces of the bearings. Since the primary load, both static and dynamic, upon the bearings is vertical, the deflection of shaft 42 is essentially in a vertical plane. The bearing thus swings in response to such deflection primarily about an axis perpendicular to the plane of FIG. 2, for example.

The set screws 100 are mounted in the ears 101, welded to hanger webs 84, and freely enter the radial bores 94 in the respective bearing sleeves close to support areas 99. The opposite faces of each bore 94 act as abutment surfaces which engage opposed stop surfaces on the setscrew 100, locating the bearings both axially and rotatively with respect to the hanger assemblies, and also effectively defining the transverse fulcrum axis about which the bearing swings in response to shaft deflection. That fulcrum axis is indicated at 98. Set screws 100 are accessible for insertion and removal through access apertures 102 in hangar housing 82. Right hand shaft bearing 91 is typically axially fixed with respect to support shaft 42, as by sprocket roller 46 and bevel gear 78 which are pinned to the shaft on opposite sides of the bearing, acting as locating collars with suitable thrust washers 104 between them and the bearing. The shaft is thereby axially defined with respect to the gate and hence also with respect to left hand bearing 90. The latter incorporates retaining means for its bushing 96, shown as the flange 105 and the removable retaining ring 106.

FIG. 4A illustrates a modified bearing structure, wherein the bushing 96 is annular as in the previous form, but bearing sleeve 93a has inner and outer cylindrical surfaces that are mutually eccentric, as shown in somewhat exaggerated form for clarity of illustration. Bores 94a are provided at several angularly spaced positions about the axis 97 of the outer sleeve surface. In assembling the gate support mechanism in a loading compartment, the vertical height of each end of the gate relative to shaft 42 is independently adjustable by rotation of the bearing sleeve, and is then locked by insertion of pin 100 in a selected one of the bores 94a. Such adjustment produces gate rotation in its own plane and is useful for making the side edges of the gate parallel to the compartment side walls, and for properly alining the locking pins 54 and 55 at the bottom of the gate with the apertures in floor rails 48. It will be understood that many functionally equivalent structures may be employed for retaining the bearing sleeve in the selected angular position, pin 100 being merely illustrative. For example, an ear welded to sleeve 93a adjacent carrier web 84 may be anchored by a shoulder bolt threaded into a selected one of a series of angularly spaced bores in the web.

Adjustment of the height of each end of the gate by the above described eccentric mechanism involves also some relative lateral movement of the gate ends parallel to the supporting rails. That lateral movement is preferably held to a minimum by rotating the bearing sleeves only through 180°. Thus, the defining bores 94a in FIG. 4A are circumferentially distributed in only one direction from the position of lowest gate adjustment. The total range of lateral gate movement is then only the eccentric spacing between shaft axis 43 and outer sleeve axis 97, whereas the total range of vertical gate movement is twice that eccentric spacing. Under that condition, the lateral gate movement can ordinarily be accommodated by the normal clearance provided for the locking pins in their respective locking apertures in the rails. When a greater range of vertical adjustment is desired, requiring increased eccentricity, one of the sprockets 112, to be described, is preferably made rotationally adjustable with respect to shaft 42. For example, if one sprocket is pinned to the shaft, as at 118 in FIG. 2, the shaft may be crossbored at a plurality of different angles, indicated for two bores at 117 and 117a in FIG. 4A, the angles between each two bores being equal to an integral multiple of the angle between adjacent sprocket teeth plus the desired adjustment of the sprocket angle. During assembly of the gate in the compartment, any transverse gate movement that accompanies the required vertical adjustments can then be compensated to the required approximation by selection of the appropriate mutual orientation of the sprockets.

Sprocket rollers 44 and 46 have cylindrical surfaces 112 from which the sprocket teeth 113 project. Faces 112 are supported on rails 40, typically rolling on one flange of a reinforcing angle 110 that is continuously welded to the upper face of rail flange 41. Sprocket teeth 113 enter uniformly spaced sprocket apertures 114 in angle 110. Right sprocket roller 46 is pinned to shaft 42, while left sprocket roller 44 is preferably splined to the shaft, as indicated at 116, to accommodate any slight variation in spacing between the two supporting rails 40. Rotation of shaft 42 therefore advances both ends of the shaft equally along the rails, maintaining the entire gate perpendicular to the side walls of the car. For that reason, shaft 42 may be referred to as a squaring shaft.

The sprocket teeth 113 are retained in rail apertures 114 by keepers 120, which restrict vertical sprocket movement and prevent disengagement. Each keeper comprises a bracket member 121, journaled on the hub of the sprocket roller, and a keeper plate 123. The latter is releasably secured to an offset portion 122 of bracket 121 by the screws 124 and extends under the rail edge almost to a point opposite roller face 112. Since keepers 120 are mounted directly on the sprocket rollers they shift axially with the rollers and maintain accurate alinement with the edge of rail flange 41 regardless of inequalities of rail spacing. Keeper plates 123 extend over an appreciable length of the rail flange, as shown best in FIG. 3, insuring smooth sliding of the keepers along the rail surfaces as the gate is moved.

With the described structure, any deflection of support shaft 42, especially deflection in a vertical plane due to the variable dynamic loading imposed by the gate during intermittent vertical accelerations of the entire car body, is readily accommodated by bodily angular movement of the bearings 90 and 91 about the effective fulcrum points 98. Regardless of such shaft deflections, the bearing load is applied from hangar web 84 to bearing sleeve 93 always in a substantially radial direction and in a plane bisecting the length of the bearing. Hence the load is necessarily distributed uniformly over the length of bushings 96.

A further important feature of the described structure, shown clearly in the right hand portion of FIG. 2, is the spatial or geometrical relationship between the effective bearing fulcrum 98 and bevel gears 76 and 78. That relationship can be seen by considering the pitch cones 126 and 128 of the respective gears 76 and 78, which cones intersect in the line 127. Line 127 may be considered to represent the surface of contact of the two gears, which is perpendicular to the plane of FIG. 2. A radius drawn from the fulcrum axis at 98 to the intersecting gear teeth, as indicated at 129, is essentially perpendicular to pitch cone intersection 127. In other terms, surface 127 is essentially tangential with respect to fulcrum axis 98, being generally parallel to the arc 130 described about that fulcrum axis at the region of gear engagement. The result of that geometrical relationship is that during vertical deflection of support shaft 42 in the plane of FIG. 2, the interengaging teeth of gears 76 and 78 slide longitudinally of each other. The depth of penetration of the teeth of the respective gears is not significantly affected. Hence the described relation avoids risk of damage to the gear teeth or to the bearings of drive shaft 70, which are preferably relatively light. It will be seen that intermittent vehicle accelerations perpendicular to the plane of FIG. 2, with accompanying horizontal deflections of shaft 42, exert no appreciable forces between the two gears, since they are accommodated by free rotation of drive shaft 70.

Each of the locking pins 50, 51, 54 and 55 comprises a shank 140 of rectangular transverse section carrying three pointed prongs 142 at its working end, spaced to enter three of the uniformly spaced locking apertures 144 in suspension rails 40 or floor rails 48. Each pin shank is slidably mounted in freely fitting apertures 145 in the vertically spaced outer and inner horizontal webs 146 and 147 in gate columns 34 and 35. Apertures 145 preferably fit the pin shanks freely enough to permit limited side movement of the pins as they enter the rail apertures, facilitating their initial entrance.

All the locking pins are controlled by the single control shaft 60, which is journaled horizontally just below intermediate gate rail 36 on the two plain bearings 62. As shown best in FIG. 7, those bearings are mounted on the mounting plates 150 which are bolted to the inner web portions 162 of the respective edge columns 34 and 35 of the gate. Plates 150 bridge the vertically elongated access apertures 152 in the column webs (FIG. 5). Apertures 152 of similar form are provided in both inner and outer webs 162 and 163 of the edge columns, and a somewhat smaller aperture 153 is provided in the channel web 164 of central column 31 (FIG. 1), through which shaft 60 passes typically without bearing support. Dual crank arms 155 are rigidly and preferably permanently mounted on shaft 60 at its left and right ends, respectively, within the column chambers. Those crank arms are closely adjacent the assembled bearings, defining the axial position of shaft 60, as shown best in FIG. 7.

The coupling links 158 extend between pivot pins 157 in the crank arms and pivot pins 159 in the respective locking pin shanks, on which they are retained in any suitable manner, as by washers and cotter pins. Those links preferably include length adjusting mechanism, shown as the fittings 161 which are axially threaded on the crank ends of the respective links. The links are typically adjusted to cause the lower locking pins to engage their rail apertures slightly ahead of the upper pins during the gate locking operation.

The radius of each crank arm 155 is approximately equal to the desired total movement of the coupled locking pin between the fully extended pin position engaging the rail aperture, as in FIG. 5, and the fully retracted pin position free of the rail, as in FIG. 6. Hence the locking pins are shiftable between gate locking and releasing positions in response to rotation of control shaft 60 through approximately 90°. In practice, the shaft may be rotated through an angle somewhat greater than that, such as 100 to 110°, for example. Typical angular positions of manual handles 64 and 65 in gate locking and releasing positions are shown in FIGS. 5 and 6, respectively. The gate locking position of shaft 60 is defined by a positive stop of suitable construction, shown illustratively as the two arms 160, which are rigidly mounted on cross rail 36, as by welding, and directly engage the respective shaft handles 64 and 65. In that position the handles are generally vertical and lie between the front and rear faces of the gate frame.

In accordance with one aspect of the invention, those stops 160 are arranged in such position that the crank pins 157 pass over center with respect to the links 158 in reaching their gate locking position, shown in FIG. 5. That is to say, the axis of each link 158, defined by the pivot pins 157 and 159 at opposite ends of the link and indicated in FIGS. 5 and 6 by the line 156, when extended beyond the axis 61 of control shaft 60, passes on one side of the shaft axis in releasing position of the mechanism (FIG. 6) and shifts to the other side of the shaft axis in locking position of the mechanism (FIG. 5).

A further aspect of the invention provides particularly convenient and effective means for insuring that the gate will be securely locked whenever it is unattended. For that purpose a prestressed spring is coupled between control shaft 60 and the gate frame in such a way as to yieldingly urge the shaft toward gate locking position. That spring is sufficiently prestressed to effectively drive all the locking pins to their locking positions. If one or more of the pins should engage a rail between locking apertures 144, any slight gate movement will permit the pin to enter one aperture or another, so that the gate reliably becomes fully locked. Moreover, since in locking position of the coupling mechanism all pin linkages are effectively over center, as already described, even violent vibrations or accelerations are ineffective to transmit any significant torque through the linkages to the control shaft, such as might cause it to rotate against the force of spring 170. The self-locking action of the control mechanism is more certain and reliable in the present mechanism than in previous structures in which springs were applied directly between the gate structure and one or more of the locking pins. Moreover, since the present control structure does not require any latch mechanism to retain it in locked position, damage due to breakage of such mechanism or failure of personnel to secure it properly is positively avoided.

The present invention further provides a particularly suitable spring mechanism for directly biasing control shaft 60 toward locking position. The normally straight and flat leaf spring 170 is received axially within control shaft 60, which is of tubular form. One end of the spring is rotatively fixed with respect to the shaft, as by fitting in a keying formation of the shaft. For example, the right hand end of tubular shaft 60 is flattened and welded at 172, in a plane shown illustratively perpendicular to crank arms 155, forming an internal diametrical channel of V-section adapted to strongly grip an end of the spring. The opposite end of spring 170 projects from the open end of shaft 60 and extends across part of the chamber in column 34 to a defining formation mounted on outer web 163 of that column. That defining formation typically comprises the cylindrical boss 175, with one end deeply channeled diametrically at 174 to receive the spring end. The boss is mounted at its other end on the mounting plate 176 which is bolted to outer column web 163, bridging the clearance opening 152 in that web. The spring is torsionally prestressed during assembly by rotating mounting plate 176 clockwise through the required angle, typically of the order of 90°, after engaging the spring end in channel 174. Once assembled, the spring is axially defined between channels 174 and 172. The spring width is preferably only slightly less than the inside diameter of shaft 60. Under transverse shaft vibration the resulting frictional contact between spring and shaft then tends to damp shaft rotation, stabilizing the system.

An advantage of the present structure is that control shaft 60, crank arms 155 and both handles 64 and 65 can be rigidly assembled to form a permanent subassembly, with bearings 62 on their mounting plates 150 in position on the shaft. The subassembly is inserted from one edge of the gate frame through web apertures 152 in the edge columns and aperture 153 in the central column. Bearing plates 150 are then bolted to the column webs. Spring 170 is inserted and retained by mounting the boss 175 as already described.

Apertures 152 in the column webs serve also as access apertures through which an operator can conveniently reach the adjacent handle 64 or 65 when the gate is positioned opposite a side door of the lading compartment and the handles are otherwise inaccessible. For example, as indicated in phantom lines in FIG. 6, a second gate 30a may occasionally be positioned directly adjacent gate 30 in face to face relation, that is, with its front face directly opposing the front face of gate 30. As is clearly shown in that figure, the present structure permits such stacking of two oppositely facing gates without interfering with normal operation of their locking mechanisms. That is, handle 65 of gate 30 can swing freely to its illustrated gate releasing position before striking the control shaft 60a of the adjacent gate. Moreover, though the two gates are of identical design, their handles do not interfere with each other. That is because on each gate the two handles are differently spaced from the adjacent edge columns. In the present instance, the spacing of handle 64 from left column 34 is less than that of handle 65 from right column 35, typically by three or four inches. Hence when two gates are face to face as in FIG. 6, handle 65 of one gate is axially offset from the opposite handle 64a of the other gate. Therefore the control shaft of either gate can be operated without interfering with operation of the other.

FIGS. 8 to 10 show an illustrative modification of the previously described structure. In that modification each of the edge columns of the gate frame is formed by a single I-beam 180, rather than by a hollow box structure, the remainder of the frame being typically generally similar to the previous form. The locking pins are mounted inwardly of the I-beam webs 182 (FIG. 8), typically sliding in horizontal web structures as previously described. All locking pins are controlled simultaneously by the horizontal control shaft 184, which corresponds generally to shaft 60 of the previous structure. Shaft 184 is constructed in two sections, which are bolted together at 186 during assembly. The shaft is journaled in the bushings 188 mounted in bores in the I-beam webs 182 (FIG. 10) and in the central column of the gate. The crank members 194 are fixedly mounted on shaft 184 just inward of the I-beam webs, and drive the links 196 that are coupled to the respective locking pins in the general manner already described. The cranks and their linkages are thus partially enclosed and protected by the inner flanges 181 of the I-beams.

Operating handles 190 are mounted on the respective ends of shaft 184 outward of the I-beam webs and preferably lying within the channels formed by the outer flanges 183 of the respective I-beams. The flange 183 at the front face of the gate is cut away at 185 to provide clearance for the handle to swing, and may be replaced structurally by a reinforcing member 187 welded to the adjacent inner flange 181. A central handle 192 is preferably provided closely adjacent central column 189, and may conveniently be joined to shaft 184 by the bolts 186.

Control shaft 184 is continuously urged toward its gate locking position, shown in solid lines, by the springs 198, each of which acts between a bracket 199, fixed on the gate, and a lever arm 200, fixedly mounted on the shaft. When the locking pins are fully extended the crank members 194 pass over center, as previously described. Shaft rotation in the locking direction is positively limited by the fixed stop pins 201 and 202. Springs 198 insure reliable locking of the gate whenever it is left unattended, as already described in connection with the previous embodiment.

As a further safeguard against accidental release of the gate from its locked position, the present invention provides dynamic balance for the pin actuating mechanism as a whole. Such dynamic balance is attained in the present embodiment by offsetting a suitable portion of the control shaft from the shaft axis in such an azimuth as to balance the moment of the control handles 190 about the shaft axis and the effective moment due to any unbalanced component of cranks 194, coupling links 196 and the locking pins themselves. Such offset is indicated schematically at 203 for a shaft section between central column 189 and right column 180. The corresponding left section of the shaft may be similarly offset also, if required to provide the desired precision of dynamic balance. That means for obtaining balance, when properly designed in accordance with known laws of mechanics, is remarkably accurate, durable and reliable. A primary advantage of such dynamic balance is that even very sharp linear accelerations of the car do not produce any significant reaction torque about the control shaft axis that would tend to rotate the shaft even momentarily away from its gate locking position.

The present embodiment, like that previously described, permits free operation of the gate locking mechanism in presence of an immediately adjacent, oppositely facing gate. However, in the present structure that important function is attained by radial offset of the operating handles 190, rather than the axial offset previously employed. As shown best in FIGS. 8 and 10, each handle 190 includes a bracket section 204 which offsets the handle radially from shaft 184 transversely of the length of the handle. The oppositely facing gate, indicated schematically at 180a in dot-dash lines in FIG. 8, has its handle 190a oppositely offset from its shaft 184a. That offset of the handle of each gate permits operation of the locking mechanism of the other gate without interference. In FIG. 8, typical operation of the locking mechanism of the gate shown at the right to gate releasing position is indicated in dot-dash lines, with the operating handle at 190b. It will be noted that the end of handle 190b clears the handle 190a of the adjacent gate by virtue of the radial transverse offset of the latter handle, despite the fact that in the present embodiment both handles lie typically in the same axial plane. The central handle 192 of each gate, on the other hand (FIG. 9) clears the corresponding handle on the adqacent gate by virtue of their relative axial offset.

FIGS. 11 and 12 illustrate modified structure for flexibly mounting the main bearings 90 and 91 on the gate by means of flexure pivots to accommodate flexing of support shaft 42, only bearing 91 being shown explicitly. The modified structure maintains the effective axis of swinging movement of bearing 91 in the relationship to drive gears 76 and 78 that has already been described in connection with FIG. 2. The structure of FIGS. 11 and 12 utilizes a hangar assembly at each end of the gate similar to those previously described, with housing 82 and transverse web 84. In each of those assemblies, a bearing mounting plate 220 is fixedly mounted at its upper edge on housing 82, as by welding, and depends therefrom in the plane of web 84 and spaced within the relatively large web aperture 85a. The shaft bearing 91 is fixedly mounted, as by welding, in a central bore in mounting plate 220 with the shaft axis perpendicular to the plane of the plate. Plate 220 is slotted in an area indicated at 222 partially surrounding the upper side of the bearing, forming two vertical support legs 224 at the respective side edges of plate 220. Those legs essentially connect the main body of mounting plate 220 surrounding the bearing to hangar housing 82.

Legs 224 act at flexing elements which permit limited pivotal movement of the bearing about an effective axis 228 lying in the plane of the plate and defined essentially by the center portions of the two legs. The material and dimensions of mounting plate 220, and the dimensions of leg portions 224 in particular, are selected to allow bearing deflection without yielding of the plate in response to flexing of shaft 42 under all normal loads imposed by vertical accelerations. The stop blocks 230 are fixedly mounted on opposite faces of housing web 84 and are dimensioned to limit flexure of mounting plate 220 positively to a movement range that will prevent collapse or excessive deflection of the plate under abnormal vertical loads or in response to forces applied longitudinally of shaft 42. Effective pivot axis 228 corresponds generally to fulcrum axis 98, described in connection with FIG. 2. It is spatially related to the meshing gear teeth of gears 76 and 78 in the manner previously described, as indicated by the line 129a in FIG. 11. Hence the present flexure pivot structure protects the gear teeth from excessive forces in essentially the same manner as the freely mounted bearing of the previous embodiment.

FIGS. 13 and 14 illustrate a modified control handle structure that permits retraction of locking pins 50 to release the gate by swinging movement of the operating shaft handle 65 in either direction from its vertical locking position. The torsion spring 172 of the previous embodiment is omitted, and its function replaced by a spring acting directly between the gate frame and one of the pin actuating links 158. Springs in that position have been used previously for urging the locking pins of a load dividing gate toward locking position, and they may function effectively to maintain the locking pins at least partially engaged in rail apertures. However, since the point of maximum pin penetration into the aperture occurs at dead center of the control crank movement, a spring that biases the connecting link longitudinally exerts little or no torque upon the control shaft when in that position. Hence such a spring is ineffective to define the shaft position with satisfactory precision or in a positive manner.

The present aspect of this invention avoids that difficulty, permitting effectively positive definition of the control shaft at dead center position by spring means acting on one or more of the coupling links. That is accomplished by taking advantage of the lateral component of the movement with which the coupling link departs from its dead center position. The spring thus performs two distinct functions, which can be done by separate spring elements if preferred. On the one hand, the spring bears directly on the coupling link, biasing it longitudinally toward pin-engaging position. On the other hand, the spring exerts force on a mechanism of any desired type that tends to compress the spring by virtue of lateral movement of the link in either direction from dead center.

The present illustrative structure utilizes a coil compression spring 24 surrounding link 158 and coupled to it by the pin 241 at the upper end of the spring. The mechanism responsive to lateral link movement employs camming action to transform lateral link movement into longitudinal movement of the spring. The lower end of spring 240 is seated on the washer 242, which is freely slidable on link 158 and is supported on the frame web 244, which has a clearance slot 246 for the link. That slot is elongated in a plane parallel to control crank 155, and accommodates the lateral movement of link 158 that accompanies crank rotation. The upper face of web 244, on which washer 242 rides, has a channel 250 of V-section extending transversely of slot 246. Washer 242 is bent along a diameter to form a shallow V, which preferably matches channel 250 in section, at least near the apex of the V. In the present embodiment channel 250 is formed by bending the entire web. Washer 242 may be splined to link 158, as by a tab 243 extending radially inward from its inner periphery (FIG. 14) and received freely in a longitudinal groove in the link.

Web groove 250 is so placed that washer 242 nests in it in dead center position of crank 155, that is, in fully extended position of the locking pins, as shown clearly in solid lines in FIG. 13. In the present embodiment, the lower locking pin is connected to the lower crank arm 155a by the link 258 and the member 256 which slides in guide rings 257 fixed to the gate frame. Crank arm 155a is so related angularly to upper crank arm 155 that both are at dead center with respect to their respective links at the same shaft angle. Shaft handle 65 is then centered in the gate.

Handle rotation in either direction from the solid line position of FIG. 13 swings upper link 158 to a position such as 158a. Spring 240 is thereby compressed both by downward movement of pin 241 and by upward movement of washer 242, the first being due to the longitudinal component of the link movement and the second to its lateral component. During the initial departure from dead center the longitudinal component of the link movement is very small, and the spring reaction due to that movement is correspondingly small. However, the initial lateral link movement is relatively high, and is efficiently converted by camming action of the washer in groove 250 into spring compression. Hence the spring reaction, resisting such initial departure from dead center, is correspondingly high. By the time washer 242 has left the web groove, terminating the camming action, the spring reaction due to longitudinal link movement has become appreciable. With suitable detailed design of the cam action, an essentially smooth and continuous torque is exerted on control shaft 60 tending to retain it in locking position, or to return it to locking position, when displaced. The torque has an effective value even at very small displacements, acting in an essentially positive manner to retain the mechanism in a well defined locking position. Moreover, the sliding movement of washer 242 on web 244, and especially the friction developed in groove 250, provide effective damping action, tending to arrest shaft rotation at locking position after release of handle 65. The present very simple and economical mechanism thus permits convenient and entirely reliable operation of the gate locking mechanism from either side of the gate.

A further modification is shown somewhat schematically in FIGS. 15 to 20. One of the gate sideposts is indicated at 320, with control shaft at 300, corresponding generally to shaft 60 of FIG. 1, for example. Upper and lower links 316 and 318 correspond generally to links 158 of FIG. 1, driving the locking pins in response to shaft rotation. However, in the present modification those links are coupled to shaft 300 by means of a coupling mechanism that effectively amplifies the link movement for a given angular shaft movement, while permitting the gate to be unlocked by shaft rotation in either direction from its normal gate locking position.

The locking pin links 316 and 318 are pivotally connected at 314a and 314b, respectively, to the crank plate 310. That plate is not mounted on the control shaft, but is freely rotatable about the axis of pivot stud 322, fixedly mounted on the sidepost web, horizontally offset from shaft 300. Crank plate 310 carries the two driving pins 312a and 312b, by which its rotary position is defined. Those pins project into a recess 306 formed in the handle plate 302, which is fixedly mounted on the end of control shaft 300 (FIG. 17). The control handle 304 is mounted in the present embodiment on handle plate 302, the main arm being offset from the plane of that plate to clear lower link 318, as shown best in FIG. 16. Recess 306 in handle plate 302 is formed as an aperture through the plate, and is so shaped that its edges engage one or both of the driving pins 312 and thereby continuously define the rotary position of crank plate 310 about its pivot stud 322.

In normal locking position of the mechanism, as shown in FIG. 15, drive pins 312a and 312b are offset symmetrically from the plane defined by shaft 300 and pivot stud 322 and indicated at 301. The pins are then received in the respective slot-like portions 308a and 308b of aperture 306. Both pins are then constrained, confining the crank plate to dead center position with respect to the links 316 and 318, with the locking pins fully extended.

As handle 304 is swung clockwise from the locking position of FIG. 15 through the intermediate position of FIG. 18 to the gate releasing position of FIG. 19, slot 308a swings downward about shaft 300, carrying pin 312a with it toward and across plane 301. However, due to the shorter lever arm of the pin with respect to pivot stud 322, crank plate 310 is driven about the pivot stud at a higher angular velocity than that of handle plate 302. The ratio of the two velocities may be selected within a considerable range according to requirements, being approximately two to one in the present illustrative embodiment. During the described clockwise movement the lower driving pin 312b moves out of its slot 308b into the enlarged clearance portion of aperture 306. That clearance portion, which typically connects the two slot regions, also accommodates the relative movement of pivot stud 322. With appropriate design, that stud may act as a positive stop for limiting the movement of the handle plate.

When handle 304 is swung in the opposite direction, that is, counterclockwise as seen in the present figures, from locking position, the crank plate is driven via lower pin 312b, upper pin 312a moving into the clearance region of the aperture, as shown in FIG. 20. That figure represents fully released position of the mechanism, with locking pins fully withdrawn, as may be seen by comparing the link positions in FIGS. 19 and 20. With handle deflection in either direction, the coupling acts through the pin closest to the plane of the shaft and pivot stud.

The present coupling mechanism is well adapted to be used in combination with the spring arrangement of FIGS. 13 and 14, crank plate of the present structure then corresponding to crank arms 155 and 155a of FIG. 13. The spring 240 of FIG. 13 then tends to maintain crank plate 310 in locking position as in FIG. 15, and the locking plate may be considered to drive control shaft 300 via the coupling mechanism just described. It will be evident that pivot stud 322 or its equivalent may be mounted, if preferred, by means of a suitable bracket on the righthand web of sidepost 320, as seen in FIG. 16.

Aperture 306 is then not required to clear the stud, and can comprise two distinct slots or channels having pin driving portions, similar to the portions 308a and 308b of the present embodiment, and arcuate clearance portions curving toward each other but not necessarily meeting. Many other functionally equivalent camming structures may be employed for coupling crank plate 310 and control shaft 300.

We claim:
1. In a load dividing system for a vehicle lading compartment, the combination of
   a pair of rails mounted in the compartment in mutually spaced parallel and substantially horizontal relation,
   a support shaft extending between the rails and carrying roller means rotatively fixed with respect to the shaft for rolling on the respective rails longitudinally thereof,
   two bearing means rotatably mounted on the shaft adjacent the respective roller means, the shaft extending without bearing support between said bearing means,
   load dividing gate means including a load dividing gate and structure supporting the gate on the bearing means for movement longitudinally of the rails in response to shaft rotation, said supporting structure permitting limited relative bodily angular movement of the bearing means about respective horizontal axes essentially perpendicular to the shaft in response to variable shaft deflection under the dynamic load of the gate means,
   a manually rotatable drive shaft journaled on the gate means on an axis essentially parallel to the plane of the gate and transversely intersecting the support shaft adjacent one of the bearing means,
   and interengaging bevel gears fixedly mounted on the respective shafts to rotatively couple the same, the bevel gears being so positioned with respect to said one bearing means that the pitch cone intersection of the bevel gears is essentially tangential with respect to the said axis of the angular movement of said one bearing means,
   and means for releasably locking the gate means at a selected position in the compartment.
2. The combination defined in claim 1, and wherein
   said bearing means comprise respective substantially rigid outer sleeves and inner bushings within the sleeves and in which the shaft is rotatable,
   and said supporting structure includes transverse members having mutually alined and axially spaced apertures of diametral dimensions to freely enclose the respective bearing sleeves to support the gate means on the bearings,
   and interengaging stop means on the sleeves and on the supporting structure acting to position the transverse members axially with respect to the sleeves substantially midway thereof.
3. The combination defined in claim 1, and wherein
   said supporting structure includes support members on which the gate is supported,
   flexure members having respective portions rigidly mounted on the support members, portions rigidly mounted on the bearing means and intermediate portions capable of flexure about said respective horizontal axes.
4. In a load dividing system for a vehicle lading compartment, the combination of
   a load dividing gate,
   means for moving the gate between a plurality of working positions in which it extends transversely of the compartment,
   a plurality of locking elements mounted on the gate for movement relative thereto between gate locking and gate releasing positions,
   locking formations fixedly mounted on the vehicle in positions to be engageable by said locking elements in each of said gate working positions,
   a control member mounted on the gate for angular movement about a member axis between gate locking and gate releasing positions and carrying a plurality of crank pivots offset from that axis,
   link structures interconnecting the locking elements with respective crank pivots for positively driving the locking elements between their locking and releasing positions in response to member rotation between its said locking and releasing positions, respectively, said gate locking position of the control member being essentially at or beyond a dead center position with respect to each of the link structures, and thereby locking each link structure against longitudinal movement in response to inward force exerted on the locking pin,
   resilient means exerting on the control member a torque directed toward said gate locking position, said torque having a value that is effective to produce member rotation at all member positions spaced from said gate locking position,
   and manually actuable means for moving the control member toward its releasing position against the torque of said resilient means,
   said resilient means comprising a coil compression spring surrounding one of said link structures, with one spring end longitudinally fixed with respect to the link structure,
   and means supporting the other end of the spring with respect to the gate and including means coupled to the link structure and acting to compress the spring in response to the lateral component of link structure movement away from gate locking position.
5. In a load dividing system for a vehicle lading compartment, the combination of
   a load dividing gate,
   means for moving the gate between a plurality of working positions in which it extends transversely of the compartment,
   a plurality of locking elements mounted on the gate for movement relative thereto between gate locking and gate releasing positions,
   locking formations fixedly mounted on the vehicle in positions to be engageable by said locking elements in each of said gate working positions,
   a control member mounted on the gate for angular movement about a member axis between gate locking and gate releasing positions and carrying a plurality of crank pivots offset from that axis,
   link structures interconnecting the locking elements with respective crank pivots for positively driving the locking elements between their locking and releasing positions in response to member rotation between its said locking and releasing positions, respectively, said gate locking position of the control member being essentially at or beyond a dead center position with respect to each of the link structures, and thereby locking each link structure against longitudinal movement in response to inward force exerted on the locking pin,
   resilient means exerting on the control member a torque directed toward said gate locking position, said torque having a value that is effective to produce member rotation at all member positions spaced from said gate locking position,
   and manually actuable means for moving the control member toward its releasing position against the torque of said resilient means,
   said control member comprising a tubular shaft extending substantially the entire width of the gate and journaled thereon,
   said resilient means comprising an elongated torsionally stressed spring member within the tubular shaft rotatively fixed at one end with respect to the shaft, rotatively fixed at the other end with respect to the gate and prestressed in a direction to urge the shaft toward locking position, and said spring member having a transverse dimension nearly equal to the internal diameter of the tubular shaft, whereby oscillatory shaft rotation is damped by friction between the shaft and the spring member.

6. In a load dividing system for a vehicle lading compartment, the combination of a load dividing gate, means for moving the gate between a plurality of working positions in which it extends transversely of the compartment, a plurality of locking elements mounted on the gate for movement relative thereto between gate locking and gate releasing positions, locking formations fixedly mounted on the vehicle in positions to be engageable by said locking elements in each of said gate working positions, a control member mounted on the gate for angular movement about a member axis between gate locking and gate releasing positions and carrying a plurality of crank pivots offset from that axis, link structures interconnecting the locking elements with respective crank pivots for positively driving the locking elements between their locking and releasing positions in response to member rotation between its said locking and releasing positions, respectively, said gate locking position of the control member being essentially at or beyond a dead center position with respect to each of the link structures, and thereby locking each link structure against longitudinal movement in response to inward force exerted on the locking pin, resilient means exerting on the control member a torque directed toward said gate locking position, said torque having a value that is effective to produce member rotation at all member positions spaced from said gate locking position, manually actuable means for moving the control member toward its releasing position against the torque of said resilient means, and structure mounted on the control member for dynamically balancing the control member and associated structures to make the torque exerted on the control member by virtue of linear bodily acceleration of said vehicle less than the torque continuously exerted by said resilient means in locking position of the control member.

7. The combination defined in claim 6, and wherein said control member comprises an elongated shaft extending essentially horizontally and journaled on a shaft axis on the gate, and said balancing structure comprises a section of said shaft that is offset from the shaft axis.

8. In a load dividing system for a vehicle lading compartment, the combination of two load dividing gates of essentially identical design, each gate having two side edges, a load engaging rear face and a front face parallel thereto, means mounting the gates transversely of the lading compartment in oppositely facing relation for movement longitudinally of the compartment between a plurality of positions that include respective positions in which the gates are closely adjacent each other with their front faces directly mutually opposed, a plurality of locking elements mounted on each gate for movement relative thereto between gate locking and gate releasing positions, locking formations fixedly mounted on the vehicle in positions to be engageable by said locking elements in each of said gate positions, a control shaft journaled horizontally on each gate parallel to and between said gate faces for rotation between gate locking and gate releasing positions, coupling structures interconnecting the locking elements with the control shaft for driving the locking elements of each gate simultaneously between their locking and releasing positions in response to shaft rotation between its locking and releasing positions, respectively, two handles rigidly mounted on the shaft adjacent the respective gate edges and extending from the shaft generally radially, said handles lying between said gate faces in locking position of the shaft and extending transversely through the front face of the gate in releasing position of the shaft, said two handles of each gate being differently spaced axially of the control shaft, whereby, with the gates in said closely adjacent, oppositely facing positions, each handle of one gate is axially spaced from the adjacent handle of the other gate and the control shaft of each gate is operable between its said positions without interference from the control shaft handles of the other gate.

9. In a load dividing system for a vehicle lading compartment, the combination of two load dividing gates of essentially identical design, each gate having two side edges, a load engaging rear face and a front face parallel thereto, means mounting the gates transversely of the lading compartment in oppositely facing relation for movement longitudinally of the compartment between a plurality of positions that include respective positions in which the gates are closely adjacent each other with their front faces directly mutually opposed, a plurality of locking elements mounted on each gate for movement relative thereto between gate locking and gate releasing positions, locking formations fixedly mounted on the vehicle in positions to be engageable by said locking elements in each of said gate positions, a control shaft journaled horizontally on each gate parallel to and between said gate faces for rotation between gate locking and gate releasing positions, link structures interconnecting the locking elements with respective crank pivots for driving the locking elements of each gate simultaneously between their locking and releasing positions in response to shaft rotation between its locking and releasing positions, respectively, two handles rigidly mounted on the shaft adjacent the respective gate edges, each handle extending generally radially from the shaft and lying between said gate faces in locking position of the shaft and extending transversely through the front face of the gate in releasing position of the shaft, each handle having at least its radially inner portion transversely offset from the shaft to lie closely adjacent the load engaging face of the gate in locking position of the shaft, whereby, with the gates in said closely adjacent, oppositely facing positions, the shaft of each gate is operable between its said positions, with its handles clearing the adjacent handles of the other gate by virtue of said offset thereof.

10. In a load dividing system for a vehicle lading compartment, the combination of a load dividing gate mounted for movement between a plurality of working positions in which it extends transversely of the compartment.

a plurality of locking elements mounted on the gate for movement relative thereto between gate locking and gate releasing positions, locking formations fixedly mounted on the vehicle in positions to be engageable by said locking elements in each of said gate working positions, a control member mounted on the gate for angular movement about a member axis between a gate locking position and two gate releasing positions angularly spaced on opposite sides of the gate locking position, a plurality of crank elements mounted on the gate for angular movement about respective crank axes spaced from the member axis and parallel thereto, each crank element having a gate locking position and two gate releasing positions angularly spaced on opposite sides of the gate locking position, said angular spacings for the crank elements exceeding the corresponding said angular spacings for the control member, a plurality of driving formations fixedly mounted on each crank element radially offset from the axis thereof, the driving formations being oppositely offset from the plane of the axes of the control member and the crank element in gate locking position thereof, cam means mounted for rotation with the control member and adapted to engage the respective driving formations to drive the crank elements between their said positions in correspondence with control member movement between its said positions, said cam means engaging one driving formation of each crank element throughout their movement between gate locking position and one gate releasing position, and engaging the other driving formation of each crank element throughout their movement between gate locking position and the other gate releasing position, and linkage structures interconnecting the crank elements with respective locking elements for driving the same between their locking and releasing positions in response to crank element movement.

11. In a load dividing system for a vehicle lading compartment, the combination of a load dividing gate mounted for movement between a plurality of working positions in which it extends transversely of the compartment, a plurality of locking elements mounted on the gate adjacent the respective corners thereof and movable relative to the gate between gate locking and gate releasing positions, locking formations fixedly mounted on the vehicle in positions to be engageable by said locking elements in each of said gate working positions, a control shaft journaled on the gate on a horizontal shaft axis parallel to the plane of the gate and manually rotatable between a gate locking position and two gate releasing positions angularly spaced on opposite sides of the gate locking position by angles approximating 45°, a driving member mounted on the shaft at each end thereof, a crank member mounted on the gate adjacent each end of the shaft for angular movement about an axis parallel to the shaft axis and spaced therefrom, each crank member having a gate locking position and the two gate releasing positions angularly spaced on opposite sides of the gate locking position by angles approximating 90°, coupling means mounted on the driving member and on the crank member at each end of the shaft for driving the rotation of the crank members in correspondence to the rotation of the control shaft, said coupling means comprising, axially projecting pins mounted on one of the members radially offset from the axis thereof, the pins being oppositely offset from the plane of the axes of the members in gate locking position thereof, and elongated recesses formed on the other member in position to receive the respective pins, said recesses having working portions that are generally parallel to said plane and oppositely offset therefrom in gate locking position of the members, and having clearance portions that converge toward each other, one pin engaging the working portion of its recess throughout member rotation from gate position to one gate releasing position, and the other pin engaging the working portion of its recess throughout member rotation from gate locking position to the other gate releasing position, and linkage structures interconnecting each crank member with the locking elements at two corners of the gate for driving said elements between their locking and releasing positions in response to crank member movement.

12. In a load dividing system for a vehicle lading compartment having a floor and two spaced parallel side walls, the combination of a pair of rails having longitudinally spaced defining formations and mounted in the compartment in mutually spaced parallel and substantially horizontal relation adjacent the upper portions of the respective side walls, a support shaft extending between the rails and carrying sprocketed roller means rotatively fixed with respect to the shaft for rolling longitudinally of the respective rails and for engaging the defining formations to maintain the shaft in uniform transverse relation to the rails, load dividing gate means including a load dividing gate and structure supporting the gate on the shaft for movement longitudinally of the rails in response to shaft rotation, and means for releasably locking the gate means at a selected position in the compartment and including at least one row of longitudinally spaced locking formations mounted in the compartment adjacent the floor and parallel to said rails, and locking structure mounted on the gate for releasably engaging a selected one of the locking formations, said gate supporting structure comprising two bearing means spaced longitudinally of the shaft and mounted thereon for free relative rotation with respect to the shaft axis, structure mounting the gate on the bearing means with at least one of the bearing means relatively rotationally adjustable with respect to an axis parallel to the shaft axis and offset therefrom, to aline said locking structure with said row of locking formations, and means for locking the bearing means against said relative rotation in a selected mutual angular relation.

13. The combination defined in claim 12, and wherein said one bearing means comprise a substantially rigid sleeve and an annular bushing within the sleeve in which the shaft is rotatably received, the sleeve having an inner generally cylindrical surface engaging the outer surface of the bushing and having an outer generally cylindrical surface that is eccentric with respect to the inner sleeve surface, said adjustment axis of the bearing means relative to the gate supporting means essentially coinciding with the cylindrical axis of the outer surface of the sleeve.

14. The combination defined in claim 12, and wherein said structure mounting the gate on the bearing means includes means permitting limited swinging movement of the bearing means relative to the gate supporting structure with respect to an axis perpendicular to the shaft axis.

15. The combination defined in claim 12, and including also means for adjustably varying the relative rotational position of the sprocket elements of the respective roller means.

16. In a load dividing system for a vehicle lading compartment, the combination of a load dividing gate, means for moving the gate between a plurality of working positions in which it extends transversely of the compartment, a plurality of locking elements mounted on the gate for movement relative thereto between gate locking and gate releasing positions, locking formations fixedly mounted on the vehicle in positions to be engageable by said locking elements in each of said gate working positions, a control member mounted on the gate for angular movement about a member axis between gate locking and gate releasing positions and carrying a plurality of crank pivots offset from that axis, link structures interconnecting the locking elements with respective crank pivots for positively driving the locking elements between their locking and releasing positions in response to member rotation between its said locking and releasing positions, respectively, said gate locking position of the control member being essentally at or beyond a dead center position with respect to each of the link structures, and thereby locking each link structure against longitudinal movement in response to inward force exerted on the locking pin, resilient means exerting on the control member a torque directed toward said gate locking position, said torque having a value that is effective to produce member rotation at all member positions spaced from said gate locking position, and manually actuable means for moving the control member toward its releasing position against the torque of said resilient means, said resilient means comprising a spring and means coupling one end of the spring to one of the link structures and coupling the other end of the spring to the gate, said coupling means including structure movable with said link structure and acting to compress the spring in response to the longitudinal component of the link structure movement from gate locking position toward gate releasing position, and said coupling means including cam structure acting to compress the spring in response to the lateral component of link structure movement from gate locking position toward gate releasing position.

References Cited

UNITED STATES PATENTS

| | | | |
|---|---|---|---|
| 2,752,864 | 7/1956 | McDougal et al. | 105—376 |
| 2,911,925 | 11/1959 | Adler et al. | 105—376 |
| 3,168,055 | 2/1965 | Van der Hyde et al. | 105—376 |
| 2,543,143 | 2/1951 | Wells et al. | 296—28 |
| 3,017,843 | 1/1962 | Loomis et al. | 105—376 |
| 3,217,664 | 11/1965 | Aquino et al. | 105—376 |
| 3,241,502 | 3/1966 | Magarian et al. | 105—376 |

DRAYTON E. HOFFMAN, Primary Examiner